United States Patent
Mason, Jr.

(10) Patent No.: US 9,305,011 B2
(45) Date of Patent: Apr. 5, 2016

(54) METHOD FOR IMPROVING MEAN TIME TO DATA LOSS (MTDL) IN A FIXED CONTENT DISTRIBUTED DATA STORAGE

(75) Inventor: Robert S. Mason, Jr., Uxbridge, MA (US)

(73) Assignee: HITACHI DATA SYSTEMS CORPORATION, Santa Clara, CA (US)

( * ) Notice: Subject to any disclaimer, the term of this patent is extended or adjusted under 35 U.S.C. 154(b) by 917 days.

(21) Appl. No.: 11/675,224

(22) Filed: Feb. 15, 2007

(65) Prior Publication Data

US 2007/0189153 A1 Aug. 16, 2007

Related U.S. Application Data

(60) Provisional application No. 60/773,853, filed on Feb. 16, 2006, provisional application No. 60/847,229, filed on Sep. 26, 2006.

(51) Int. Cl.
*G06F 17/30* (2006.01)

(52) U.S. Cl.
CPC .... *G06F 17/30188* (2013.01); *G06F 17/30082* (2013.01); *G06F 17/30197* (2013.01)

(58) Field of Classification Search
USPC .................. 370/216; 711/114, 162; 707/202
See application file for complete search history.

(56) References Cited

U.S. PATENT DOCUMENTS

| | | | | |
|---|---|---|---|---|
| 5,412,801 A | * | 5/1995 | de Remer et al. | 714/20 |
| 5,615,352 A | * | 3/1997 | Jacobson et al. | 711/114 |
| 5,857,112 A | * | 1/1999 | Hashemi et al. | 710/8 |
| 6,154,853 A | * | 11/2000 | Kedem | 714/6 |
| 6,262,984 B1 | * | 7/2001 | Rochberger | 370/395.2 |
| 6,751,616 B1 | | 6/2004 | Chan | |
| 7,000,143 B2 | | 2/2006 | Moulton et al. | |

(Continued)

FOREIGN PATENT DOCUMENTS

| | | |
|---|---|---|
| WO | WO/9739413 | 10/1997 |
| WO | WO/0161491 | 8/2001 |

OTHER PUBLICATIONS

Garcia-Molina H., et al.: "Reliable distributed database management", proceedings of the IEEE, New York, vol. 75, No. 5, Nov. 5, 1987.

*Primary Examiner* — Marcus R Smith
*Assistant Examiner* — Omeed D Rahgozar
(74) *Attorney, Agent, or Firm* — Mattingly & Malur, P.C.

(57) ABSTRACT

An archival storage cluster of preferably symmetric nodes includes a data protection management system that periodically organizes the then-available nodes into one or more protection sets, with each set comprising a set of n nodes, where "n" refers to a configurable "data protection level" (DPL). At the time of its creation, a given protection set is closed in the sense that each then available node is a member of one, and only one, protection set. When an object is to be stored within the archive, the data protection management system stores the object in a given node of a given protection set and then constrains the distribution of copies of that object to other nodes within the given protection set. As a consequence, all DPL copies of an object are all stored within the same protection set, and only that protection set. This scheme significantly improves MTDL for the cluster as a whole, as the data can only be lost if multiple failures occur within nodes of a given protection set. This is far more unlikely than failures occurring across any random distribution of nodes within the cluster.

19 Claims, 5 Drawing Sheets

(56) References Cited

U.S. PATENT DOCUMENTS

| | | |
|---|---|---|
| 7,155,466 B2 | 12/2006 | Rodriguez et al. |
| 2001/0018729 A1* | 8/2001 | Johnson ................. 711/114 |
| 2001/0044879 A1* | 11/2001 | Moulton et al. ............ 711/114 |
| 2002/0156840 A1 | 10/2002 | Ulrich et al. |
| 2002/0188655 A1 | 12/2002 | Brown et al. |
| 2003/0163597 A1 | 8/2003 | Hellman |
| 2003/0225801 A1* | 12/2003 | Devarakonda et al. ....... 707/205 |
| 2005/0120025 A1 | 6/2005 | Rodriguez |
| 2006/0026219 A1 | 2/2006 | Orenstein et al. |
| 2006/0195670 A1* | 8/2006 | Iwamura et al. .............. 711/162 |

* cited by examiner

METHOD FOR IMPROVING MEAN TIME TO DATA LOSS (MTDL) IN A FIXED CONTENT DISTRIBUTED DATA STORAGE

This application is based on and claims priority from application Ser. No. 60/773,853, filed Feb. 16, 2006, and from application Ser. No. 60/847,229, filed Sep. 26, 2006.

CROSS-REFERENCE TO RELATED APPLICATION

This application is related to application to:
U.S. Ser. No. 11/190,402, filed Jul. 27, 2005, titled "Metadata Management for Fixed Content Distributed Data Storage;" and
U.S. Ser. No. 11/638,252, filed Dec. 13, 2006, titled "Policy-Based Management of a Redundant Array of Independent Nodes."

BACKGROUND OF THE INVENTION

1. Technical Field

The present invention relates generally to techniques for highly available, reliable, and persistent data storage in a distributed computer network.

2. Description of the Related Art

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

Figure 1:
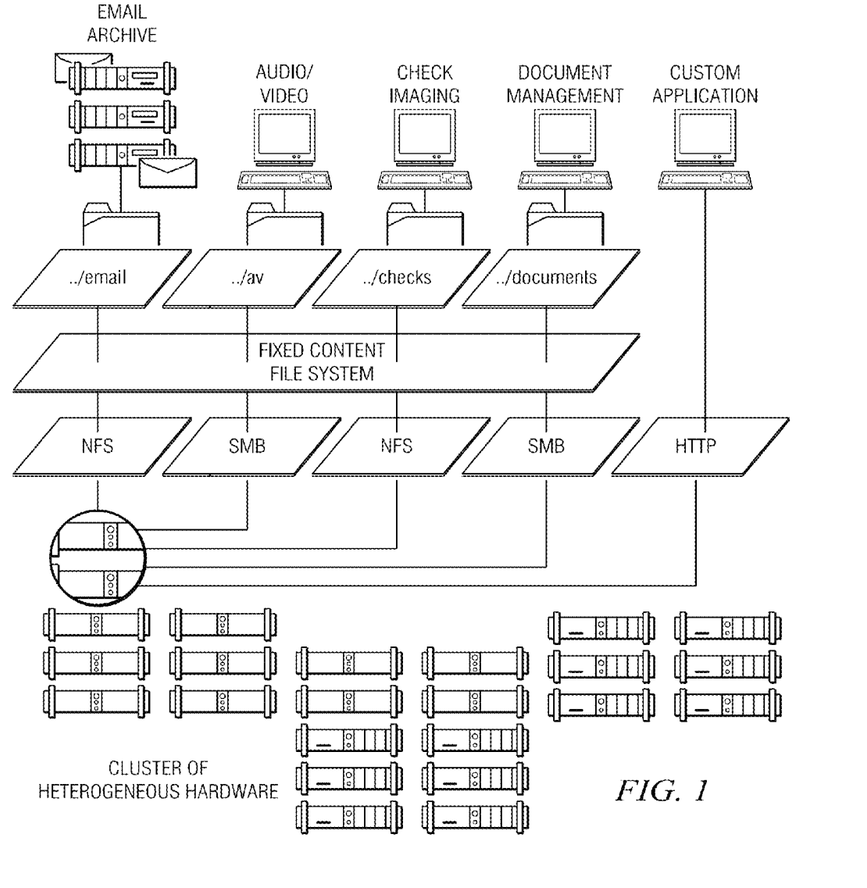
FIG. 1 is a simplified block diagram of a fixed content storage archive in which the present invention may be implemented.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
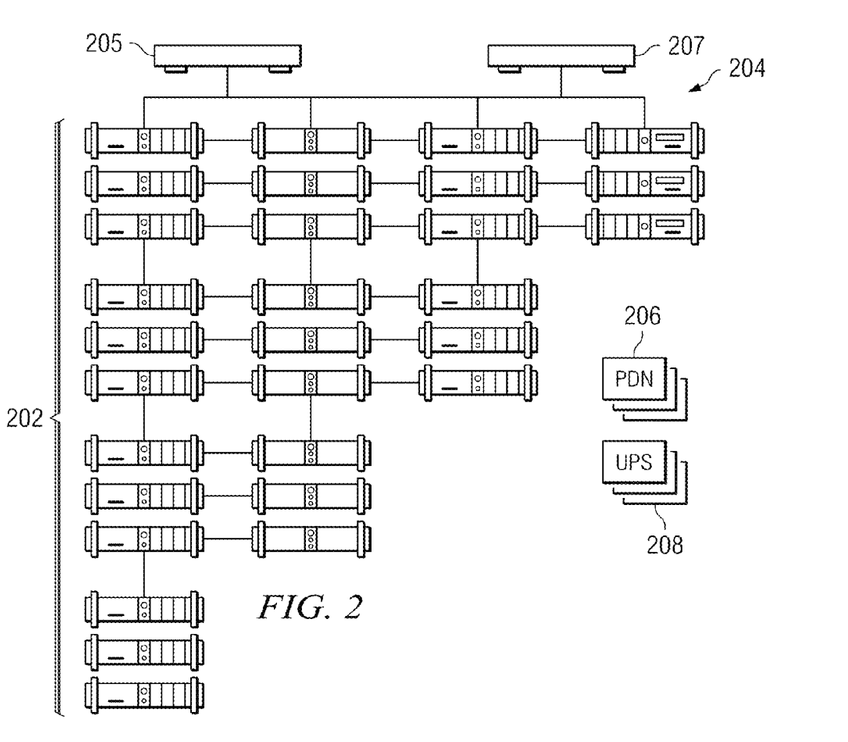
FIG. 2 is a simplified representation of a redundant array of independent nodes each of which is symmetric and supports an archive cluster application according to the present invention.

As described in commonly-owned U.S. Pat. No. 7,155,466, it is known in a RAIN-based archival system to incorporate a distributed software application executed on each node that captures, preserves, manages, and retrieves digital assets. FIG. 2 illustrates one such system. A physical boundary of an individual archive is referred to as a cluster. Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster. MTDL may end being lower than required because, for example, a needed copy of an object may be unavailable it a given disk (on which a mirror copy is stored) within a given node fails unexpectedly.

BRIEF SUMMARY OF THE INVENTION

An object of the invention is to improve a mean time to data loss (MTDL) in a scalable disk-based archival storage management system. In one embodiment, this object is achieved by constraining a distribution of the copies of a given archive object to nodes within a given "protection set" of nodes that also store the object itself. This technique significantly reduces data loss (as compared to random distribution of the objects across the cluster) because multiple failures would have to occur within the nodes of the protection set before the data would be lost.

In one embodiment, an archival storage cluster of preferably symmetric nodes includes a data protection management system that periodically organizes the then-available nodes into one or more protection sets, with each set comprising a set of n nodes, where "n" refers to a configurable "data protection level" (DPL). At the time of its creation, a given protection set is closed in the sense that each then available node is a member of one, and only one, protection set. When an object is to be stored within the archive, the data protection management system stores the object in a given node of a given protection set and then constrains the distribution of copies of that object to other nodes within the given protection set. As a consequence, all DPL copies of an object are all stored within the same protection set, and only that protection set. This scheme significantly improves MTDL for the cluster as a whole, as the data can only be lost if multiple failures occur within nodes of a given protection set. This is far more unlikely than failures occurring across any random distribution of nodes within the cluster.

Preferably, the data protection management system is distributed. In particular, the data protection management system preferably is implemented as a distributed set of protection manager instances, with each protection manager instance executing on a given node of the cluster. Protection managers execute a leader election protocol to determine which of the set of instances is managing the protection sets at a given time. The protection sets that are available at a given time preferably are defined by a protection set map. A protection manager instance operating as a leader has the capability of creating and managing a protection set map, and broadcasting that map to other protection manager instances throughout the cluster. Periodically, the protection manager verifies the accuracy of the map, and it may break or create new sets based on new data (e.g., information about nodes that are down, that are at capacity, information about new nodes joining the cluster, or the like). To create a new protection set map, the leader obtains a list of all nodes as well as a current protection set map, if any. If any nodes within a given protection set (as defined in the current map) are down or otherwise lack capacity, the leader breaks the set. Then, for all possible protection levels, the leader creates a new protection set map, preferably by grouping similar nodes that are currently ungrouped with a set of size matching the DPL. Once the new protection set map is created, it is stored locally (at the leader node) and broadcast to the other protection manager instances.

Thus, according to an illustrative embodiment, a data protection management scheme automatically creates one or more data protection sets within the archive and then intelligently stores a data object and its copies (i.e., within one, and only one, data protection set) to improve MTDL. This design ensures high availability of the data objects even upon a number of simultaneous node failures across random nodes within the cluster.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

As seen in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include: NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which is comprised of several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

Figure 3:
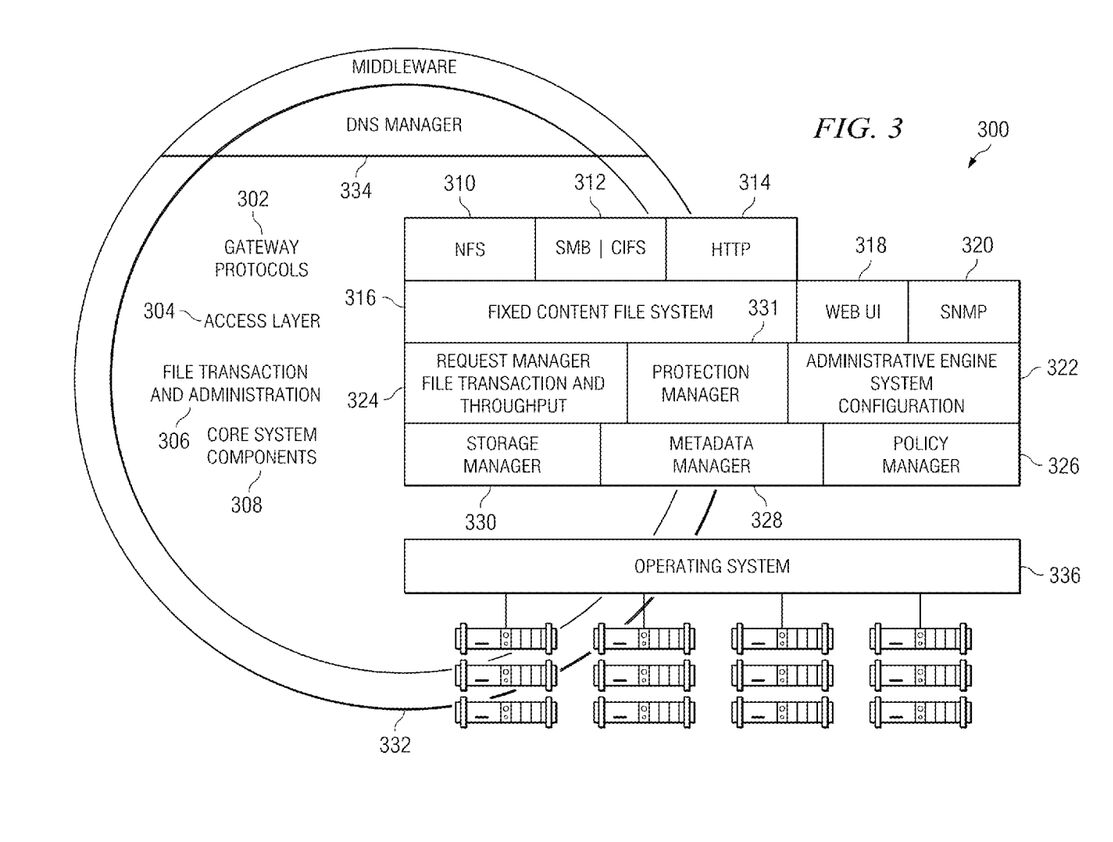
FIG. 3 is a high level representation of the various components of the archive cluster application executing on a given node.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. This operation is described in more detail below. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse local directly structures.

According to an embodiment of the present invention, a request manager 330 includes or has associated therewith a protection manager instance 331. Protection manager instances 331 running on the nodes cooperate to comprise a distributed data protection management system. As will be described in more detail below, the data protection management system periodically organizes the then-available nodes into one or more protection sets, with each set comprising a set of n nodes, where "n" refers to a configurable "data protection level" (DPL). At the time of its creation, a given protection set is closed in the sense that each then available node is a member of one, and only one, protection set. When an object is to be stored within the archive, the data protection management system (either directly or through the storage managers) stores the object in a given node of a given protection set and then constrains the distribution of copies of that object to other nodes within the given protection set. As a consequence, all DPL copies of an object are stored within the same protection set, and only that protection set. This scheme significantly improves MTDL for the cluster as a whole, as the data can only be lost if multiple failures occur within nodes of a given protection set. This is far more unlikely than failures occurring across any random distribution of nodes within the cluster. This operation will be described in more detail below.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the ArC application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file it generates a full path and file name for the representation for which it will be responsible. In a representative embodiment, each object to be stored on a storage manager is received as raw data to be stored, with the storage manager then adding its own metadata to the file as it stores it to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type) and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager also ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files.

Protection Management

According to the present invention, a protection management system improves mean time to data loss (MTDL) by constraining distribution of object copies to nodes within a given protection set. As used herein, a protection set is a set of nodes for a given protection level. Thus, where fault tolerance is described in the context of a data protection level (DPL), a protection set typically comprises DPL number of nodes. A protection set map according to the present invention is the set of all possible protection sets for all given possible DPL levels. For example, on an eight (8) cluster node with nodes N={1, 2, 3, 4, 5, 6, 7, 8}, the protection set map is preferably as set forth below (with the maximum DPL available on the cluster being equal to the number of nodes):

DPL 1: all nodes; this information does not need to be persisted

DPL 2: {1, 2} {3, 4} {5, 6} {7, 8}
DPL 3: {1, 2, 3} {4, 5, 6} [nodes 7 and 8 not used]
DPL 4: {1, 2, 3, 4} {5, 6, 7, 8}
DPL 5: {1, 2, 3, 4, 5} [nodes 6, 7, and 8 not used]
DPL 6: {1, 2, 3, 4, 5, 6} [nodes 7 and 8 not used]
DPL 7: {1, 2, 3, 4, 5, 6, 7} [node 8 not used]
DPL 8: {1, 2, 3, 4, 5, 6, 7, 8}

A protection set map (like the one above) may comprise any number of data protection levels. More generally, the protection set map may be considered a data structure. As will be described below, preferably the protection set map is generated periodically and on an automated basis, and it is made available to protection manager instances running throughout the cluster. Alternatively, the protection set map is generated as needed, e.g., in response to a given occurrence, such as the addition of new nodes to the cluster, the upgrading of a legacy cluster, a node failure, or the like. A preferred technique, but not necessarily a limiting one, is to have a given protection manager instance operating on a given node act as a leader (by execution of a known leader election algorithm) for a set of protection manager instances. The leader generates the protection set map, saves it, and then broadcasts the new protection set map to other protection manager instances throughout the cluster. Thus, at a given time (or over a given time period), a protection set map showing the grouping of cluster nodes within the given protection sets is available to the request manager processes that are operating in the cluster. As can be seen, the protection set map informs a request manager process (that has been designated to store an archive object and its mirror copies) of the then-current protection set within which each node of the cluster is a member. Thus, in the event that request manager process selects a given node within a given protection set for storage of the archive object, that request manager process (and its associated protection manager process instance, which may one and the same) also ensures that the DPL copies of that object are stored in other nodes of only that given protection set. Thus, according to a preferred embodiment, a given object is only stored in a given protection set for that DPL level. As an example, if a DPL2 object is stored in protection set {1, 2} as designated in protection set map, copies of that object will be placed in a node within the set and no others (at least at the time of storage). Thus, the object or its copies should not exist in the nodes {3, 4}, the nodes {5, 6}, and so on. In this manner, it is easily seen that two failures in this system (of DPL2 objects) would require the failures to be in the same protection set (namely, in protection set {1, 2}) for data loss to occur. As compared to an object distribution scheme wherein random distribution of object copies is used, data loss is much less likely. Thus, MTDL is improved.

A primary function of the protection manager is to manage the protection set map. In particular, the protection manager is capable of executing a leader election, and preferably it has knowledge of the state of each node in the cluster (e.g., through a node state database, or the like). Thus, for example, the protection manager tracks nodes that are in an unavailable state and when the last time a given node was "seen" by the cluster. The protection manager also preferably has information about state changes of its associated storage manager (which, as noted above, may be a single integrated process). According to one embodiment, this information (or some portions thereof) is used by the protection manager to determine if the then-current protection sets are accurate. A given protection set may no longer be accurate because a given node in the set has failed, has become overloaded; one or more protection sets may no longer be accurate because additional nodes have been provisioned into the cluster. Periodically, or as otherwise needed, the protection manager (and, in particular, the instance operating as the leader) verifies the accuracy of the then current protection set map and, as a result, it may then break or create new protection sets (either based on the result of such verification and/or other new data). In particular, protection set map creation preferably works as illustrated in the process flow shown in FIG. 4.

Figure 4:
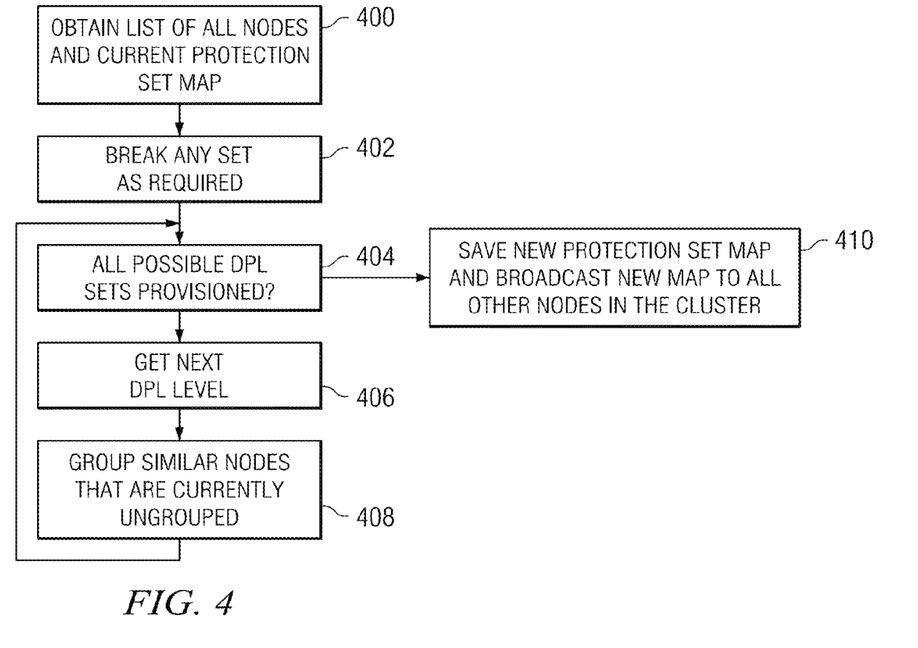
FIG. 4 illustrates a process flow for the creation of a protection set map according to the present invention.

The process begins at step 400 with the leader obtaining a list of all nodes and a current protection set map. At step 402, and for all nodes in a protection set down for more than a given configurable time, the leader breaks that set. The routine then tests at step 404 to determine whether all possible DPL levels have been provisioned. If not, the routine continues at step 406 to get the next DPL level. At step 408, the routine groups similar nodes (e.g., by one or more attributes, such as capacity, number of processors, or the like) that are currently ungrouped with a set of size matching DPL. The routine then returns to step 404. If all DPL levels are then set (i.e., the test at step 404 is positive), the routine branches to step 410, where the new protection set map is persisted and broadcast to all other nodes. This completes the protection set map generation process.

Preferably, a protection set is not broken unless one or more nodes within that set are unavailable for configurable amount of time. This avoids shuffling stored data around the cluster based on rapid node bounces. As noted above, the protection manager leader instances persists (saves) the protection set map that it creates, preferably as a configuration object with a plain text format within a distributed database with service access to facilitate debugging and testing. In general, protection sets do not need to be written or read frequently. As noted above, the protection manager also broadcasts the protection set map to all other protection managers running in the cluster. When a given protection manager (not the leader) initializes, it may not have knowledge of the current protection set map. When a new protection set map is created, preferably a message is sent to all protection managers to load a new map. By using leader election to select which protection manager creates and broadcasts the new map, race conditions are avoided. Preferably, the protection manager also provides helper methods for policy execution and storage manager selection. In particular, given an external file (EF) and its associated internal files (IFs), the protection manager determines appropriate repair steps if needed (i.e., to move EF/IFs into a fully protected state). The protection manager validates an external file and its associated internal files as needed to perform repair. The protection manager may also perform protection policy detection. A given protection policy may be configurable. One of ordinary skill also will appreciate that protection policy needs to be started on all nodes after upgrading a cluster that does not implement the MTDL improvement scheme of the present invention. The protection policy detection also may work in conjunction with other archive cluster functions, such as a cluster balance function. For example, as nodes join or leave the clustered archive, it is known that the system may automatically adjust the cluster's load balance and optimize performance by redistributing files across member nodes. Thus, for a cluster with a static DPL, preferably nodes are balanced in the protection sets. In an appropriate circumstance (to enforce cluster balance), this may require DPL copies of a given IF to be moved to another set as the data is redistributed within the system. In particular, as noted, cluster balance policy is designed to enforce even (or substantially even) distribution of data in the system. If the system goes out of balance (e.g., because new nodes are added or given nodes are dropped), then objects must be moved around by the cluster balance policy to attempt to even out the distribution. If as a result one copy of an object is moved, the other copy must also be moved to maintain the protection sets.

Figure 5:
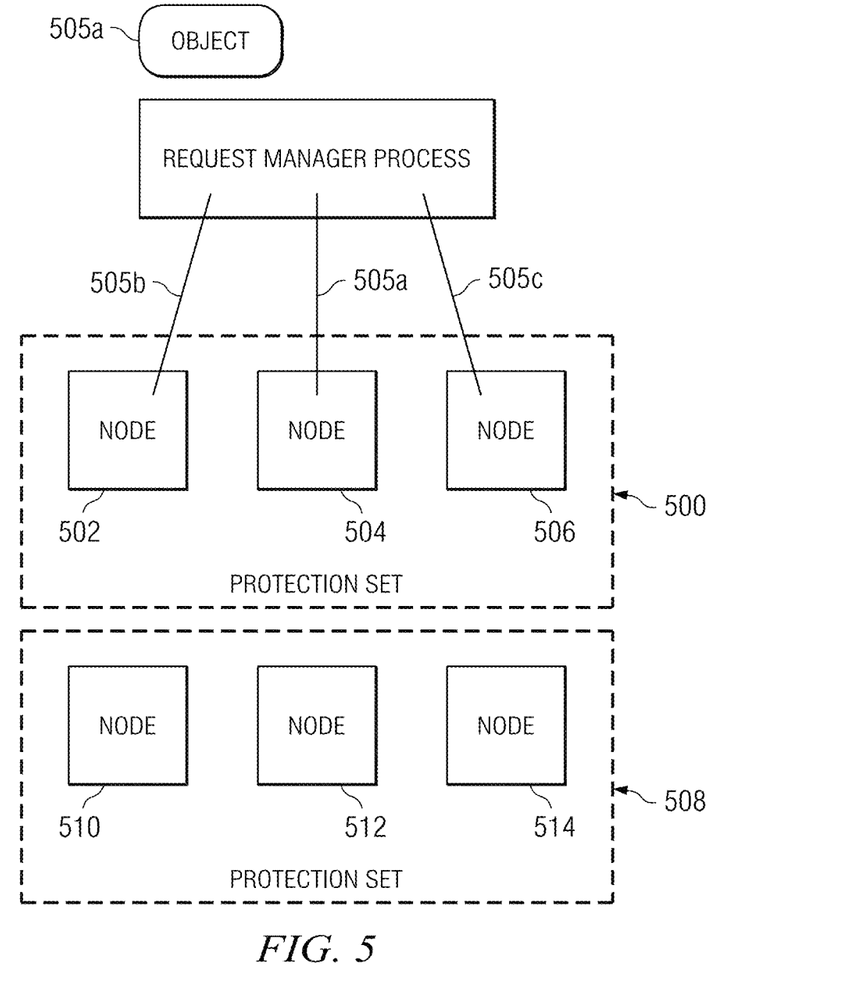
FIG. 5 illustrates how a given protection manager instance constrains distribution of copies of a data object to improve MTDL according to the present invention.

Preferably, storage manager selection (i.e., the selection by the request manager of which storage manager in which node to store a given object being written to the archive) is augmented to enforce the protection set mappings defined in the then-current protection set map. In this manner, all copies are an object are stored within the same protection set in which the object itself is stored. This is illustrated in FIG. 5. In this example (with DPL3), the protection set 500 has associated therewith nodes 502, 504 and 506. Another protection set 508 comprises nodes 510, 512 and 514. As noted above, at a given time (i.e., with respect to a then-current version of the protection set map), no node is a member of more than one protection set. The object itself 505a has been written (e.g., by a given request manager process) to, say, node 504. Thus, instead of implementing random distribution of the DPL copies 505b and 505c, these copies are written to the remaining available nodes 502 and 506 in the protection set 500. Thus, copy 505b is written to node 502, while copy 505c is written to node 506.

The "DPL" configuration parameter should not be taken as limiting, as any convenient way of designating fault tolerance may be used. Regardless of nomenclature, the present invention provides significant MTDL improvement by ensuring that the copies of an object (that has been written to a node within a data protection set) are written only to other nodes within that same set. Moreover, while not described in detail, one of ordinary skill in the art will appreciate that other techniques (such as multiple parity protection and the like) may be used in conjunction with the method of the present invention.

The data protection map may be stored in any convenient manner, such as in a database implemented using PostgreSQL, which is available as open source. Map broadcasts may use any convenient inter-node communications mechanism TCP/IP multicasts. As noted above, when a new protection set map is generated, the protection manager leader initiates a distribution of that map to the other nodes (and it may request suspension of processing until all nodes have it). Ordinary processing is resumed once the system confirms that all of the nodes have the new map.

Preferably, RAID schemes are used for the internal files (IFs) to further improve the MTDL, especially as the number of nodes increases (e.g., >20). As noted above, as a result of the described scheme, nodes are mirrored logically (e.g., pairs of nodes contain the same data).

If desired, the protection manager may also enforce a repair policy that, upon node failure, attempts to restore a given protection set pairing that has been broken as a result of such failure. This repair policy may leverage other repair functions available to the archive. Thus, for example, the policy manager may call functions within the request manager to initiate repair operations. Those repair operations would then use the storage manager selection process, the protection manager, as well as other internal components to accomplish the policy repair operation.

The present invention facilitates the provision of an archive management solution that is designed to capture, preserve, manage, and retrieve digital assets. The design addresses numerous requirements: unlimited storage, high reliability, self-management, regulatory compliance, hardware independence, and ease of integration with existing applications. Clusters of commodity hardware running Linux (for example) provide a robust platform and a virtually unlimited archive. The system can scale, e.g., from a few storage node servers to many nodes that store thousands of terabytes of data. The unique architecture ensures that storage capacity can always keep pace with an organization's increasing archive requirements. As noted above, although the system is designed never to lose a file, improved MTDL is achieved by replicating data across dynamically-created protection sets within the cluster. If a given disk or node fails, the cluster automatically fails over to other nodes within the protection set that maintain replicas of the same data.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

As described above, the request manager component uses the protection manager on inbound writes to archive and also to fulfill policy repair operations when policy violations are detected. While the request manager is preferred, other components of the application may be used to support or provide the protection manager functionality.

Having described the invention, what I now claim is as follows:

1. A protection management method for a system of nodes, wherein each node comprises a processor, and a plurality of drives, the protection management method comprising:
    grouping the plurality of nodes, for each of a plurality of data protection levels which define a number of nodes to store a copy of object data, into a group of one or more protection sets being associated with the respective data protection level, wherein a given node is a member of plural protection sets being associated with different data protection levels but only the member of one protection set among the one or more protection sets associated with the respective data protection level;
    defining, for each of a plurality of protection levels, a plurality of protection sets being associated with respective protection levels;
    storing copies of first object data that has a first protection level to each node in a first protection set which is associated with the first protection level based on a protection set map, and constraining distribution of the copies of the first object data to each node within the first protection set which is associated with the first protection level; and
    storing copies of second object data that has a second protection level to each node in a second protection set which is associated with the second protection level based on the protection set map, and constraining distribution of the copies of the second object data to each node within the second protection set which is associated with the second protection level.

2. The protection management method as described in claim 1, wherein the protection level is defined as a data protection level.

3. The protection management method as described in claim 1, further comprising:
    updating the protection set map by one of the nodes; and
    broadcasting an updated protection set map to other nodes.

4. The protection management method as described in claim 3, wherein the step of updating the protection set map includes:
    obtaining information about a current state of each of the nodes;
    determining whether a given node in a first protection set is in a given state;
    if the given node in the first protection set is in the given state, breaking the first protection set; and
    forming a new protection set by grouping at least one other node that is then currently ungrouped with one or more nodes of the first protection set that has been broken.

5. The protection management method as described in claim 4, further including selecting the one of the nodes that performs the updating using leader election.

6. The protection management method as described in claim 1, further including periodically updating the protection set map upon a given occurrence.

7. The protection management method as described in claim 6, wherein the given occurrence is one of: a failure of a given node within a protection set, and addition of a new node to the system.

8. The protection management method as described in claim 1, further comprising:
    storing copies of third object data that has the first protection level to each node in a third protection set which is associated with the first protection level based on the protection set map, and constraining distribution of the copies of the third object data to each node within the third protection set which is associated with the first protection level.

9. A protection management method for a system including a plurality of nodes, the protection management method comprising:
    grouping the plurality of nodes, for each of a plurality of data protection levels which define a number of nodes to store a copy of object data, into a group of one or more protection sets being associated with the respective data protection level, wherein a given node is a member of plural protection sets being associated with different data protection levels but only the member of one protection set among the one or more protection sets associated with the respective data protection level;
    defining, for each of a plurality of protection levels, a plurality of protection sets being associated with respective protection levels, storing copies of first object data that has a first protection level to each node in a first protection set which is associated with the first protection level based on a protection set map, and constraining distribution of the copies of the first object data to each node within the first protection set which is associated with the first protection level; and
    storing copies of second object data that has a second protection level to each node in a second protection set which is associated with the second protection level based on the protection set map, and constraining distribution of the copies of the second object data to each node within the second protection set which is associated with the second protection level.

10. The protection management method as described in claim 9, further including updating the protection set map.

11. The protection management method as described in claim 9, wherein the protection set map is updated periodically or upon a given occurrence.

12. The protection management method as described in claim 9, further comprising:
    storing copies of third object data that has the first protection level to each node in a third protection set which is associated with the first protection level based on the protection set map and preventing distribution of the copies of the third object data to any other node in any other protection set which is associated with the first protection level.

13. A system, comprising:
a plurality of nodes, the plurality of nodes being grouped, for each of a plurality of data protection levels which define a number of nodes to be able to store a copy of object data, into a group of one or more protection sets being associated with the respective data protection level, wherein a given node is a member of plural protection sets being associated with different data protection levels but only the member of one protection set among the one or more protection sets associated with the respective data protection level; and
a network that couples the plurality of nodes;
wherein the system is configured to, upon receipt of first object data that has a first protection level, store copies of the first object data that has the first protection level to each node in a first protection set which is associated with the first protection level based on a protection set map, and constraining distribution of the copies of the first object data to each node within the first protection set which is associated with the first protection level, and
wherein the system is configured to, upon receipt of second object data that has a second protection level, store copies of the second object data that has the second protection level to each node in a second protection set which is associated with the second protection level based on the protection set map, and constraining distribution of the copies of the second object data to each node within the second protection set which is associated with the second protection level.

14. The system as described in claim 13, wherein one of the nodes is configured to update the protection set map periodically or upon a given occurrence.

15. The system as described in claim 14, wherein the one of the nodes that performs the update is further configured to broadcast the updated protection set map to other nodes.

16. The system as described in claim 14, wherein the protection set map is updated by the one of the nodes being configured to obtain information about a current state of each of the nodes, determine whether a given node in a third protection set is in a given state, break the first protection set when the given node in the third protection set is in the given state, and form a new protection set by grouping at least one other node that is then currently ungrouped with one or more nodes of the third protection set that has been broken.

17. The system as described in claim 13, wherein a number of nodes in each protection set of the given protection level is determined by the respective protection level.

18. The system as described in claim 13, wherein the nodes included in one of the protection sets for the respective protection level are different from the nodes included in another protection set for the respective protection level.

19. The system as described in claim 13, wherein the system is further configured to, upon receipt of third object data that has the first protection level, store copies of the third object data that has the first protection level to only each node in a third protection set which is associated with the first protection level based on the protection set map.

* * * * *